(12) United States Patent
Chou et al.

(10) Patent No.: US 10,959,125 B2
(45) Date of Patent: Mar. 23, 2021

(54) COLLABORATIVE TRANSMISSION METHOD AND TRANSMISSION DEVICE BASED ON UDP AND TCP CONNECTIONS

(71) Applicant: INDUSTRIAL TECHNOLOGY RESEARCH INSTITUTE, Hsinchu (TW)

(72) Inventors: Yeh-Kai Chou, Hsinchu County (TW); Cheng-Sheng Weng, Hsinchu (TW); Chi-Huang Shih, Taichung (TW); Bo-Sheng Chen, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 16 days.

(21) Appl. No.: 16/232,539

(22) Filed: Dec. 26, 2018

(65) Prior Publication Data
US 2020/0205027 A1  Jun. 25, 2020

(30) Foreign Application Priority Data
Dec. 19, 2018  (TW) .............................. 107145855 A

(51) Int. Cl.
*H04W 28/02* (2009.01)
*H04L 29/06* (2006.01)
(Continued)

(52) U.S. Cl.
CPC ..... *H04W 28/0273* (2013.01); *H04L 43/0835* (2013.01); *H04L 47/196* (2013.01); *H04L 69/165* (2013.01); *H04L 47/27* (2013.01)

(58) Field of Classification Search
CPC ....... H04L 47/10; H04L 43/04; H04L 1/0041; H04L 43/0829; H04L 47/25;
(Continued)

(56) References Cited

U.S. PATENT DOCUMENTS 6,771,594 B1  8/2004  Upadrasta
6,826,620 B1 * 11/2004  Mawhinney ............ H04L 47/10
                                            370/235
(Continued)

FOREIGN PATENT DOCUMENTS

CN       101616077 B    10/2011
CN       103166974 A     6/2013
(Continued)

OTHER PUBLICATIONS

Taiwan Patent Office, "Office Action", dated Oct. 25, 2019, Taiwan.
(Continued)

*Primary Examiner* — Hanh N Nguyen
(74) *Attorney, Agent, or Firm* — Locke Lord LLP; Tim Tingkang Xia, Esq.

(57) ABSTRACT

A collaborative transmission method and a transmission device based on UDP (User Datagram Protocol) and TCP (Transmission Control Protocol) connections are provided. The collaborative transmission method comprises: calculating a first rate and obtaining a first parameter, wherein the first rate is a rate using TCP to transmit packets and the first parameter is associated with the variation degree of the first rate; after obtaining the first rate, calculating a number of packets to be sent according to a target bit rate, the first parameter, the first rate, and a packet size, wherein the number of packets to be sent is the number of packets expected to be transmitted via UDP; and determining to use either UDP or TCP to send the packet according to a transmission flag and updating the number of packets to be sent when the packet number is not zero.

20 Claims, 7 Drawing Sheets

(51) Int. Cl.
*H04L 12/26* (2006.01)
*H04L 12/801* (2013.01)
*H04L 12/807* (2013.01)

(58) Field of Classification Search
CPC ... H04L 47/193; H04L 43/08; H04L 43/0894; H04L 43/0835; H04L 47/196; H04L 69/165; H04L 69/166; H04L 47/27; H04L 43/0852; H04L 47/12
See application file for complete search history.

(56) References Cited

U.S. PATENT DOCUMENTS

| | | | |
|---|---|---|---|
| 7,548,332 | B2 | 6/2009 | Kajiwara |
| 8,341,272 | B2 * | 12/2012 | Kleo ........................ H04L 69/16 709/227 |
| 8,356,109 | B2 | 1/2013 | Martinez et al. |
| 8,819,532 | B2 * | 8/2014 | Viger ........................ G06F 11/10 714/800 |
| 9,380,351 | B2 | 6/2016 | Zhao et al. |
| 9,847,920 | B2 * | 12/2017 | Takano .................. H04L 43/04 |
| 2002/0085587 | A1 | 7/2002 | Mascolo |
| 2006/0227811 | A1 | 10/2006 | Hussain et al. |
| 2008/0201751 | A1 | 8/2008 | Ahmed et al. |
| 2012/0173748 | A1 | 7/2012 | Bouazizi |
| 2014/0059168 | A1 | 2/2014 | Ponec et al. |
| 2014/0281018 | A1 | 9/2014 | Waclawsky et al. |

FOREIGN PATENT DOCUMENTS

| | | |
|---|---|---|
| CN | 104618337 A | 5/2015 |
| CN | 105430320 A | 3/2016 |
| TW | I419594 B | 12/2013 |
| TW | I584620 B | 5/2017 |

OTHER PUBLICATIONS

George Xylomenos et al., TCP and UDP performance over a wireless LAN, IEEE INFOCOM '99. Eighteenth Annual Joint Conference of the IEEE Computer and Communications Societies. Proceedings. IEEE, vol. 2, pp. 439-446, 1999.

Hari Balakrishnan et al., A comparison of mechanisms for improving TCP performance over wireless links, IEEE/ACM Transactions of Networking, 1997, vol. 5, No. 6.

Morteza Hashemi et al., CDP: A Coded Datagram transport Protocol bridging UDP and TCP, Proceeding SYSTOR '15 Proceedings of the 8th ACM International Systems and Storage Conference, Article No. 11, 2015.

Seoung-Bum Lee et al., Improving UDP and TCP performance in mobile ad hoc networks with INSIGNIA, 2001, IEEE Communications Magazine.

P. Venkat Ramana et al., Improved performance of UDP & TCP throughput in Wi-Fi networks for voice and data services in mobile communications with MIMO systems, IEEE Communications Magazine, vol. 39, pp. 156-165, 2001.

Salman A. Baset et al., Understanding the behavior of TCP for real-time CBR workloads, Proceeding CoNEXT '06 Proceedings of the 2006 ACM CoNEXT Conference, Article No. 57, 2006.

* cited by examiner

COLLABORATIVE TRANSMISSION METHOD AND TRANSMISSION DEVICE BASED ON UDP AND TCP CONNECTIONS

CROSS-REFERENCE TO RELATED APPLICATIONS

This non-provisional application claims priority under 35 U.S.C. § 119(a) on Patent Application No(s). 107145855 filed in Taiwan, R.O.C on Dec. 19, 2018, the entire contents of which are hereby incorporated by reference.

BACKGROUND

1. Technical Field

This disclosure relates to a method of packet transmission and transmission device, and more particularly to a collaborative transmission method and transmission device based on UDP (User Datagram Protocol) and TCP (Transmission Control Protocol).

2. Related Art

The application of using UAVs (Unmanned Aerial Vehicles) to perform aerial photography for surveillance is more and more common, such as bridge inspection, reservoir inspection, and forest and river surveillance, etc., all of which are UAV-related applications, and UAVs transmit images through wireless networks on the purpose of real-time monitoring. However, so far wireless networks still have various transmission problems, such as network congestion and drastic changes in bandwidth. When the image transmission is not smooth or the quality is low, actual applications may be affected accordingly.

On the other hand, the global audio and video market is booming. According to the report released by PwC (PricewaterhouseCoopers) Taiwan, the market scale of streaming media will exceed that of cinemas in 2018. The field of actual applications of streaming media is, for example, mobile video, video conference, video surveillance and IPTV (Internet Protocol Television) such as Apple TV, Google TV, and MOD, etc. How to avoid data loss or packet congestion due to bandwidth changes and further to improve the quality of video transmission under mobile networks or wireless networks have become an issue at present.

SUMMARY

In view of above, the present disclosure proposes a collaborative mechanism of TCP and UDP, which is applied to wireless transmission, this mechanism uses UDP to assist TCP transmissions to improve transmission quality.

According to one or more embodiment of this disclosure, a collaborative transmission method based on UDP and TCP comprising: calculating a first rate and obtaining a first parameter, wherein the first rate is a rate of transmitting packets via TCP and the first parameter is associated with a variation degree of the first rate; after calculating the first rate, calculating a number of packets to be sent according to a target transmission rate, the first parameter, the first rate, and a packet size, wherein the number of packets to be sent is a number of packets expected to be sent via UDP; and when the number of packets to be sent is not zero, determining whether to use either UDP or TCP to send a packet according to a transmission flag and updating the number of packets to be sent.

According to one or more embodiment of this disclosure, a collaborative transmitter based on UDP and TCP comprising: a detecting unit configured to obtain a first rate and a first parameter, wherein the first rate is a rate of transmitting packets via TCP and the first parameter is associated with a variation degree of the first rate; a computing unit electrically connecting to the detecting unit, wherein the computing unit calculates the first rate and calculates a number of packets to be sent according to a target transmission rate, the first parameter, the first rate, and a packet size, wherein the number of packets to be sent is a number of packets expected to be sent via UDP; and a communicating unit electrically connecting to the detecting unit and the computing unit, wherein when the number of packets to be sent is not zero, the communicating unit determines whether to use UDP or TCP to send a packet according to a transmission flag and updating the number of packets to be sent.

The above description of the disclosure and the following embodiments are intended to illustrate and explain the spirit and principles of the present disclosure, and to provide a further explanation of the claims of the present disclosure.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

The detailed features and advantages of the present disclosure are described in detail below in the embodiments. The content is sufficient for any person who is skilled in the art to understand the technical content of the present disclosure and to implement accordingly. According to the disclosed contents, the claims and the drawings of this specification, a person who is skilled in the art may easily understand the purposes and advantages related to the present disclosure. The following embodiments are intended to describe the present disclosure in further detail, but are not intended to limit the scope of the present disclosure.

The bandwidth configuration of the mobile network is set according to the number of bandwidth units and it depends on factors such as the number of users, the distance, and the moving speed. When a streaming video having a CBR (Constant-Bit-Rate) is transmitted via TCP (Transmission Control Protocol), the TCP transmission rate is limited by available bandwidth. When the available bandwidth is greater than CBR, the TCP transmission rate is limited by the CBR data amount available for transmission. Even if the TCP transmission rate keeps as same state as the CBR, it is still possible that packet loss happens due to wireless signal attenuation or network congestion.

Figure 1:
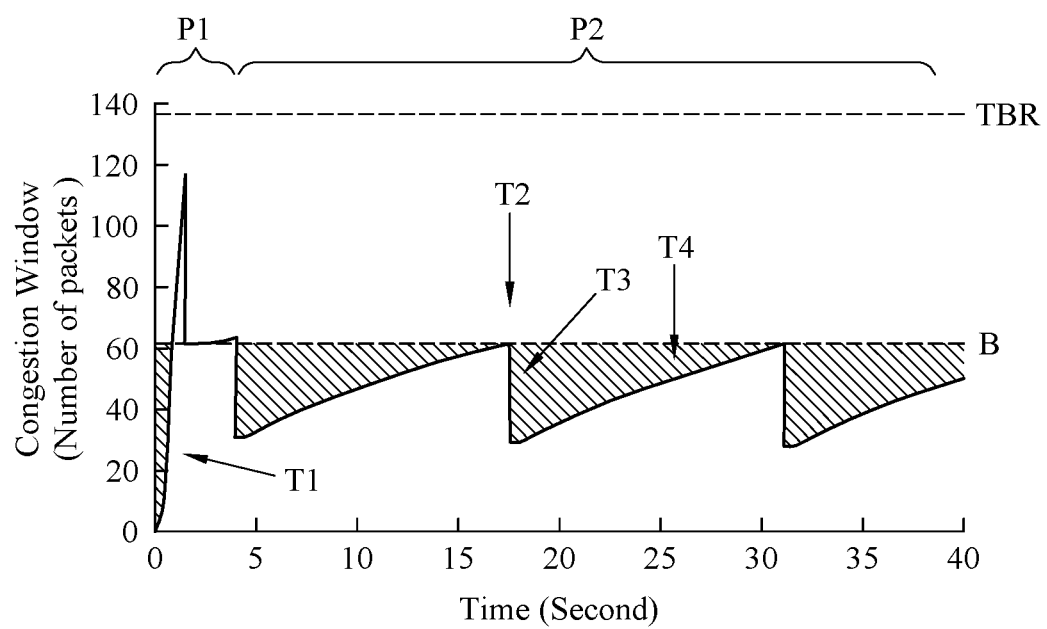
FIG. 1 is a transmission schematic of TCP based on congestion control.

Please refer to FIG. 1, which illustrates a transmission schematic of TCP based on congestion control. The available bandwidth B is smaller than expected TBR (target bit rate) as shown in FIG. 1. TCP performs a slow start algorithm in the period P1, which is a method of slowly detecting a network when TCP starts transmitting to a network with an unknown condition, whereby an available amount is determined and the network congestion caused by improperly sending a large amount of data can be avoided. As shown in FIG. 1, the number of packets in congestion windows shows an exponential increase in the interval P1. TCP performs a congestion avoidance algorithm in the interval P2, in which a packet loss occurs at the time point T2 so that packets in congestion windows shows a multiplicative decrease at the time point T3 and shows an additive increase at the time point T4. The collaborative transmission method based on UDP (User Datagram Protocol) and TCP according to an embodiment of the present disclosure can be applied in a slow start period such as period P1, in which the number of packets in congestion windows does not reach the available bandwidth, and/or in the period P2 in which packet loss occurs so that the number of packets in congestion windows does not reach the available bandwidth. The aforementioned conditions are indicated as the shadow part shown in FIG. 1. In an embodiment of the present disclosure, the transmission bandwidth may approach the available bandwidth when the available bandwidth is smaller than the expected TBR. In another embodiment of the present disclosure, the transmission bandwidth may approach the expected TBR when the available bandwidth is greater than the expected TBR.

Figure 2:
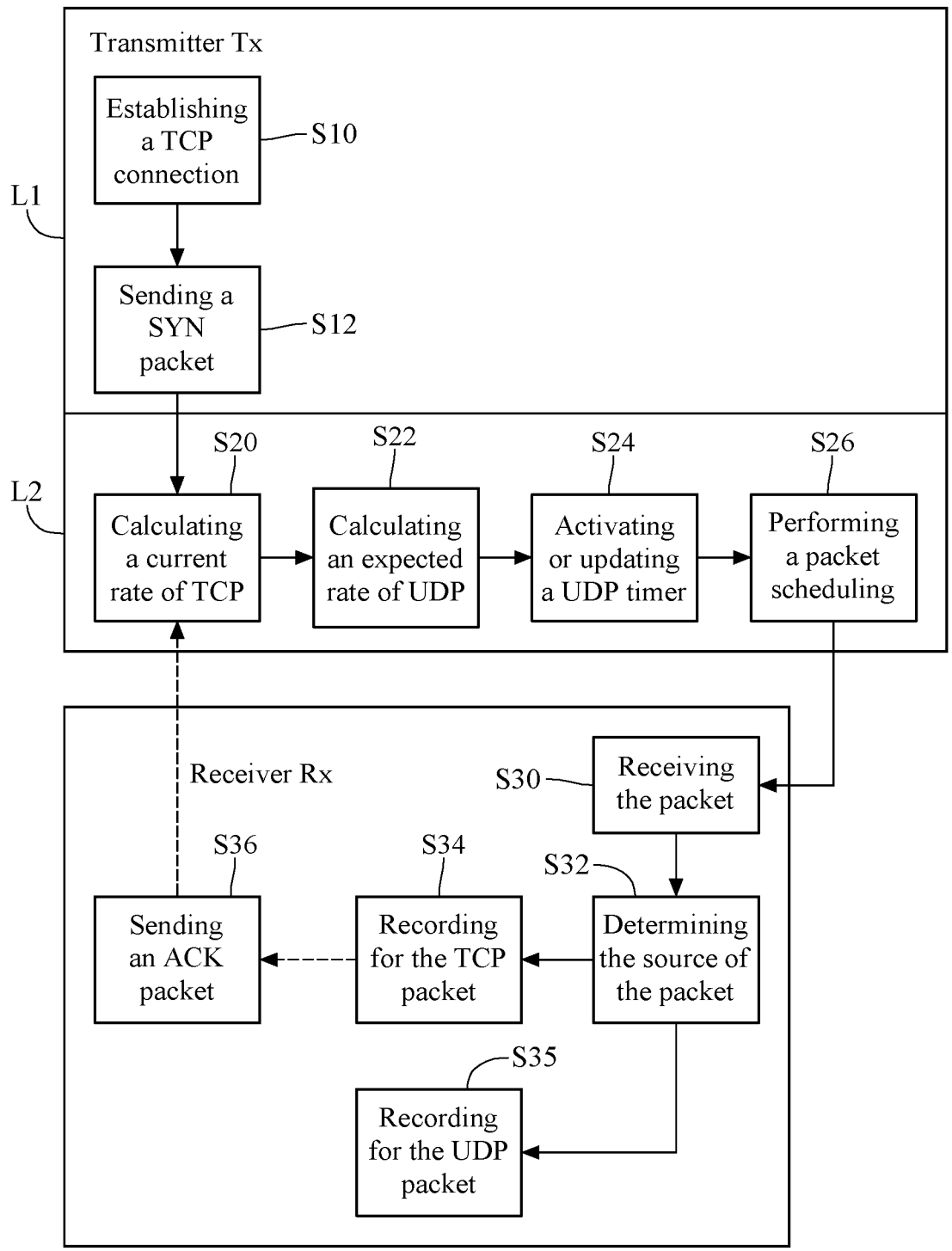
FIG. 2 is a basic flowchart including a transmitter and a receiver according to an embodiment of the present disclosure.

Please refer to FIG. 2, which illustrates a basic flowchart according to an embodiment of the present disclosure. Main steps of the collaborative transmission method based on UDP and TCP comprises step S20, step S22, step S24, and step S26, as for the details of the above steps will be described from FIG. 3A to FIG. 3C. In the FIG. 2, an overall transmission flow of the packet according to an embodiment of the present disclosure will be introduced first from the perspective of the transmitter Tx and the receiver Rx.

First, as shown in step S10, after the transmitter Tx established a TCP connection, an SYN (Synchronize Sequence Numbers) packet may be sent in step S12. Step S10 and step S12 can be operated in, for example, a network layer L1 of the OSI model (Open System Interconnection reference model).

In an embodiment, after a trustworthy connection of three-way handshake is established, step S20-S26 can be operated in the application layer L2 of the OSI model. Please refer to step S20, "calculating a current rate of TCP". In practical, the current rate of TCP can be calculated every fixed period, or the current rate of TCP can be updated every time a TPC packet is sent. The current rate of TCP can be calculated, for example, according to the following formula:

$$R_{TCP}=N_{TCP}/(T_{current}-T_{start}) \quad \text{(Formula 1).}$$

In Formula 1, $R_{TCP}$ is the current rate of TCP, $N_{TCP}$ is a total number of packets, $T_{current}$ is a current time, and $T_{start}$ is a starting time, while said current time is the earliest time transmitting packets via TCP. In an embodiment, the starting time $T_{start}$ may be adjusted in order to maintain immediacy when calculating the current rate of TCP. In practice, for example, the starting time $T_{start}$ is reset every interval time or returning to a slow start period of TCP. The total number of packets $N_{TCP}$ is a number of all packets transmitted from the starting time to the current time.

Please refer to step S22, "Calculating an expected rate of UDP". In an embodiment, the expected rate of UDP represents an insufficient part of the current rate of TCP compared to the available network bandwidth. Therefore, the expected rate of UDP is calculated, for example, according to the following formula:

$$R_{UDP}=R_{TBR}*A-R_{TCP} \quad \text{(Formula 2).}$$

In Formula 2, $R_{UDP}$ is the expected rate of UDP, A is a first parameter, $R_{TBR}$ is the target transmission rate, and $R_{TCP}$ is the current rate of TCP calculated in step S20. The unit of the aforementioned rates, for example, is kbps (kilobit per second). In an embodiment, the target bit rate is a target transmission rate/bandwidth for an application (such as a streaming video). For the convenience of description, the current rate of TCP, $R_{TCP}$, simply referred to as the first rate, and the expected rate of UDP, $R_{UDP}$, is simply referred to as the second rate.

In an embodiment, the first parameter A represents as a variation degree of the first rate, which is an average rate of packet loss in the period of TCP transmission or in the period of TCP connection. For example, the first parameter A is set to 1 when the degree of variation of the first rate is greater than a first threshold while the first parameter A is set to 1.05-1.15 when the degree of variation of the first rate is less than or equal to the first threshold. In an embodiment, the setting of the first parameter A reflects the period of current TCP transmission and/or the average rate of packet loss of TCP connection. For example, please refer to FIG. 1, when the current period is period P1 (slow start period), TCP detects the available bandwidth from a lower rate without considering a condition of packet loss, thus the value of the first parameter A is set to 1. When the current period is period P2 (congestion avoidance period), since the condition of packet loss may occur, if the data is transmitted in the target transmission rate $R_{TBR}$ only, once the condition of packet loss occurs, the total data amount received by the receiver will be less than the expected data amount under a transmission in target transmission rate. Therefore, the value of the first parameter A is set, for example, to a specific percentage more than that in the period P1, this specific percentage is, for example, the average rate of packet loss of current TCP connection. The specific percentage is set to 5% when the average rate of packet loss of TCP connection is 5% so that the first parameter A is 1.05 in the period P2. The specific percentage is set to 15% when the average rate of packet loss of TCP connection is 15% so that the first parameter A is 1.15 in the period P2.

Please refer to step S24, "Activating or updating a UDP timer". In an embodiment, when the second rate $R_{UDP}$ is greater than zero, a UDP timer is activated or the UDP timer's activating state is kept for calculating a cumulative time. When the second rate $R_{UDP}$ is zero, the UDP timer is disabled. The UDP timer is to control an interval time between sending a UDP packet and sending the next UDP packet. Specifically, this interval time is calculated according to the following formulas:

$$T_{interval} = 1/N_{UDP} \quad \text{(Formula 3)},$$

$$N_{UDP} = R_{UDP}/P \quad \text{(Formula 4)}.$$

In Formulas 3 and 4, $T_{interval}$ is the interval time, $N_{UDP}$ is the number of packets expected to be sent via UDP (in short, number of packets to be sent), and P is packet size. The unit of packet size is, for example, byte. According to the above formulas, when the current rate of TCP detected every period changes, the expected UDP transmission rate of step S22 and the UDP interval time of step S24 will be affected.

According to formula 2 and formula 4, the formula to calculate the number of packets to be sent $N_{UDP}$ may be reformed as below:

$$N_{UDP} = (R_{TBR}*A - R_{TCP})/P \quad \text{(formula 5)}.$$

Please refer to step S26, "Performing a packet scheduling". This step is to determine whether to use either UDP or TCP to send a packet, and the detail of this step will be described in FIG. 3.

Please refer to steps S30-S36 performed in the receiver Rx. Specifically, the transmitter Tx determines to use either TCP or UDP to send a packet after step S26 is performed. After receiving this packet (step S30), the receiver Rx determines the source of the packet (step S32), records packet sent via TCP (step S34) and packet sent via UDP (step S35) respectively. As described above, if the current packet is sent via TCP, the receiver Rx returns an ACK (acknowledgment) packet to the transmitter Tx, and then the transmitter Tx performs step S20 again to update the current rate of TCP after receiving this ACK packet.

Figure 3A:
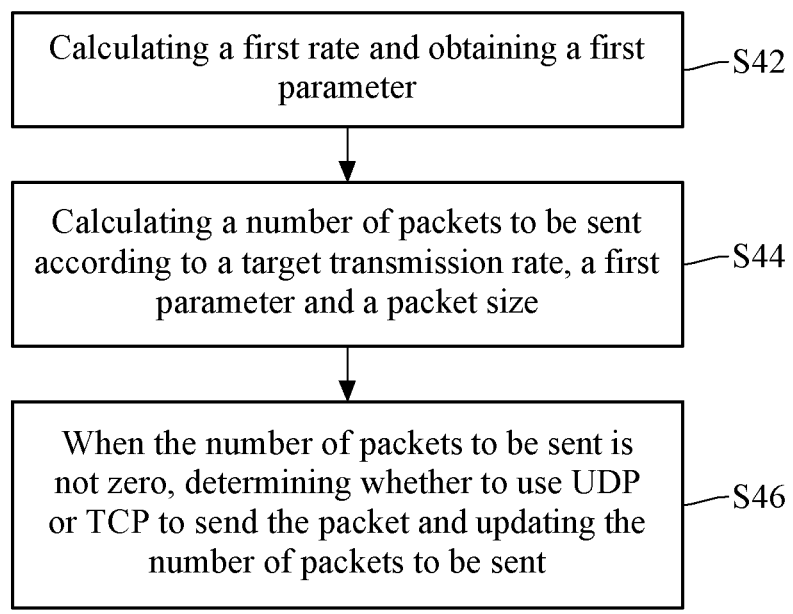
FIG. 3A is a flowchart of the collaborative transmission method based on UDP and TCP according to an embodiment of the present disclosure.

Please refer to FIG. 3A, which illustrates a flowchart of the collaborative transmission method based on UDP and TCP according to an embodiment of the present disclosure. The method comprises: step S42, calculating a first rate and obtaining a first parameter, wherein the first rate is a rate of transmitting packets via TCP and the first parameter is associated with a variation degree of the first rate; step S44, after obtaining the first rate, calculating a number of packets to be sent according to a target transmission rate, the first parameter, the first rate, and a packet size, wherein the number of packets to be sent is a number of packets expected to be sent via UDP; and step S46, when the number of packets to be sent is not zero, determining whether to use either UDP or TCP to send a packet according to a transmission flag and updating the number of packets to be sent.

Figure 3B:
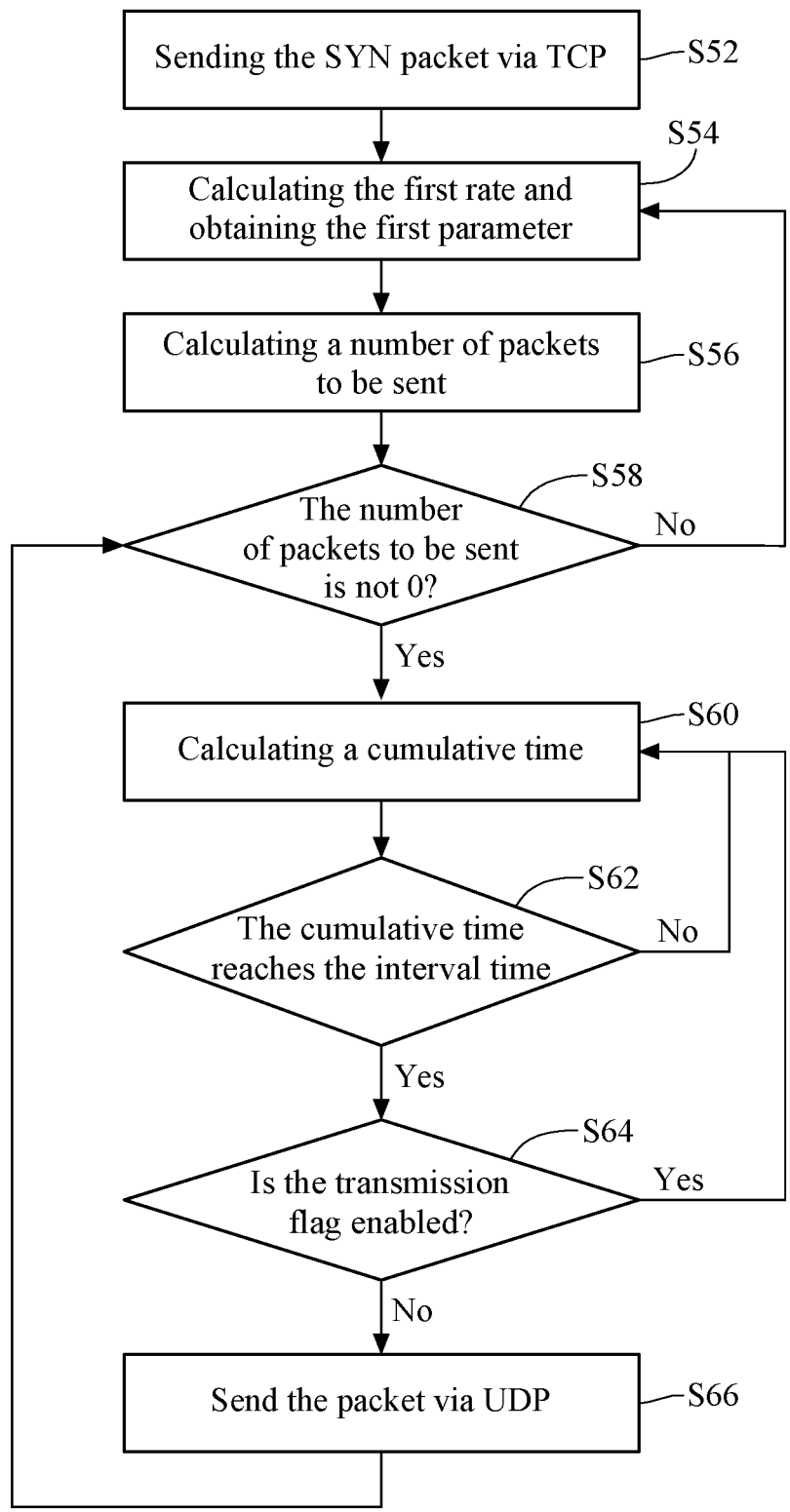
FIG. 3B is a detail flowchart of the collaborative transmission method based on UDP and TCP according to an embodiment of the present disclosure.

Please refer to FIG. 3B, which illustrates a detail flowchart of the collaborative transmission method based on UDP and TCP according to an embodiment of the present disclosure. Please refer to step S52, "sending the SYN packet via TCP". The step S52 is the same as step S12 shown in FIG. 2 and the detail will not be repeated here. Please refer to step S54, "calculating a first rate $R_{TCP}$ and obtaining the first parameter A". In an embodiment, the first rate $R_{TCP}$ is the current rate of TCP described in step S20 as shown in FIG. 2. The first rate $R_{TCP}$ may be calculated by formula 1 as described previously. The first parameter A may be obtained by, for example, determining whether the current TCP transmission is in the period of slow start or in the period of congestion avoidance.

Please refer to step S56, "calculating a number of packets to be sent $N_{UDP}$". In an embodiment, before calculating the number of packets to be sent $N_UDP$, the second rate $R_{UDP}$, which is the rate expected to transmit packet via UDP, may be calculated first according to the target transmission rate $R_{TBR}$, the first parameter A, and the first rate $R_{TCP}$, with the reference of formula 2. The number of packets to be sent $N_{UDP}$ is a number of packets expected to be transmitted via UDP and is determined by the packet size P and the second rate $R_{UDP}$ as shown in formula 4.

Please refer to step S58, determining whether the number of packets to be sent is not zero. If the number of packets to be sent $N_{UDP}$ is not zero, the next step is S60. If the number of packets to be sent $N_{UDP}$ is zero, the next step is S54. In an embodiment, if the current rate $R_{TCP}$ of TCP has not reached the target transmission rate $R_{TBR}$ (or the target transmission rate $R_{TBR}*A$) yet, the number of packets to be sent $N_{UDP}$ is determined to be not zero, and thus the next step is S60. If the current rate $R_{TCP}$ of TCP has reached the target transmission rate $R_{TBR}$ (or the target transmission rate $R_{TBR}*A$), the number of packets to be sent $N_{UDP}$ is determined to be zero, and then step S54 is performed to wait for updating the first rate $R_{TCP}$ next time.

Please refer to step S60, "calculating a cumulative time". In this step, a timer is activated or an activating state of the timer is maintained for calculating a cumulative time. As described above, the timer is disabled when the number of packets to be sent is determined to be zero in step S58 and step S54 is performed next.

Please refer to step S62, determining whether the cumulative time reaches the interval time. In an embodiment, the interval time $T_{interval}$ for sending UDP packets is calculated according to the number of packets to be sent $N_{UDP}$, as shown in formula 3. After the timer is activated, step S62 determines whether the cumulative time calculated by the timer reaches the interval time $T_{interval}$. When the cumulative time reaches the interval time $T_{interval}$, the next step is S64. Otherwise, the process returns to step S60 to calculate the cumulative time continuously.

Figure 3C:
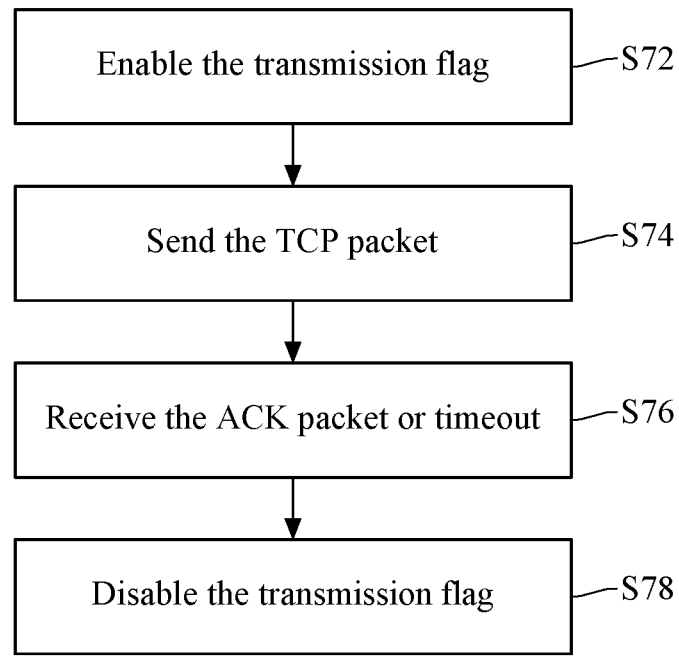
FIG. 3C is a flowchart of controlling transmission flag according to the collaborative transmission method based on UDP and TCP according to an embodiment of the present disclosure.

Please refer to step S64, determining whether the transmission flag is enabled. In an embodiment, the transmission flag is used to represent whether a TCP packet is transmitting currently. Please refer to step S64 and FIG. 3C. FIG. 3C illustrates a flowchart of controlling the transmission flag. In an embodiment, the transmission flag may be enabled before the transmitter Tx sends the TCP packet as shown in step S72, then the TCP packet is sent as shown in step S74. Please refer to step S74, the transmission flag is disabled when the transmitter Tx receives an ACK (acknowledgment) packet corresponding to the TCP packet or when a timeout condition occurs before the transmitter Tx receives the ACK packet, as shown in step S78. Therefore, at the determination of step S64, if the transmission flag is enabled, representing that there is a TCP packet transmitting currently, the operation of sending the packet via UDP is suspended. Thus it goes back to the step S60, calculating the cumulative time continuously, until the next interval time $T_{interval}$ has reached (step S62 is determined to be "yes"), and then re-determining whether the transmission flag is enabled (step S64). In an embodiment, in addition to stopping sending the packet via UDP, the UDP timer is also reset to calculate the cumulative time from the beginning. On the other hand, if the transmission flag is disabled in the determination of step S64, which represents that the TCP packet has already finished its transmission or has not been transmitted. At this time, the step S66 of FIG. 3B may be performed. The packets to be sent in the buffer are sent via UDP for improving the overall throughput. In an embodiment, it should be noticed that the first rate $R_{TCP}$ and the number of packets to be sent $N_{UDP}$ will be updated after the transmission flag is disabled, and the interval time $T_{interval}$ also changes. For example, in the process shown in FIG. 3B, suppose the original number of packets to be sent is 100, after the step S66, "sending the packet via UDP", has been performed, the next step is S58. At this time, the number of packets to be sent $N_{UDP}$ may change to 50 because of the updates of the first rate $R_{TCP}$ and the second $R_{UDP}$. Therefore, the interval time $T_{interval}$, which is calculated according to formula 3, also changes at the same time.

FIG. 3B illustrates a process of sending packets via UDP. Regarding sending packets via TCP, it depends on the original mechanism to proceed. The first rate decreases when the TCP packets cannot be transmitted due to congestion, and slowly increases afterward. In other words, no matter whether to activate UDP packet scheduling or not, the TCP packets are transmitted continuously, and the transmission flag is enabled before each TCP packet is transmitted and the transmission flag is disabled after the transmission is done. If the transmission flag is enabled, it represents that a TCP packet is transmitted currently or an ACK packet corresponding to the TCP packet is (waited to be) received currently. Therefore, rather than performing a TCP packet transmission again, it will wait for the transmission is done (and receive the ACK packet before a timeout) and then returns to step S54 to update the current first rate $R_{TCP}$ and to obtain the first parameter A. In an embodiment of the present disclosure, the transmitter Tx performs step S54 to calculate (update) the current first rate $R_{TCP}$ and obtain the first parameter A when one of the following conditions is satisfied: a synchronization packet sent via TCP; a default period is passed; and an acknowledge packet returning via TCP is received.

Figure 3D:
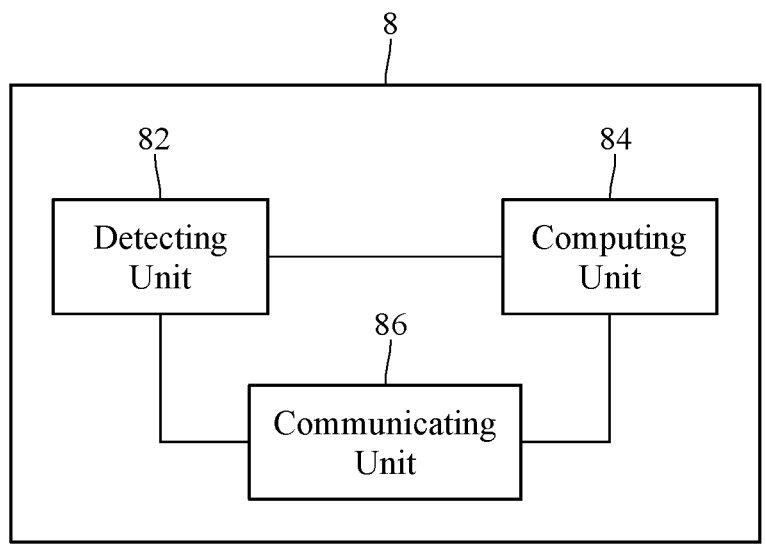
FIG. 3D is a block diagram of the collaborative transmission device based on UDP and TCP according to an embodiment of the present disclosure.

Please refer to FIG. 3D, which illustrates a block diagram of the collaborative transmission device 8 based on UDP and TCP according to an embodiment of the present disclosure. The transmission device may perform the collaborative transmission method based on UDP and TCP as previously described. In an embodiment, the collaborative transmission device 8 based on UDP and TCP comprises a detecting unit 82 configured to obtain a first rate $R_{TCP}$ and a first parameter A, wherein the first rate is a rate of transmitting packets via TCP and the first parameter is associated with a variation degree of the first rate; a computing unit 84 electrically connecting to the detecting unit 82, wherein the computing unit 84 calculates the first rate and calculates a number of packets to be sent according to a target transmission rate, the first parameter, the first rate and a packet size, wherein the number of packets to be sent is a number of packets expected to be sent via UDP; and a communicating unit 86 electrically connecting to the detecting unit 82 and the computing unit 84, wherein when the number of packets to be sent is not zero, the communicating unit 86 determines whether to use UDP or TCP to send a packet according to a transmission flag and updating the number of packets to be sent.

In an embodiment, the computing unit 84 further calculates the number of packets to be sent $N_{UDP}$ according to formula 4 and calculates the interval time $T_{interval}$ according to formula 3. The communicating unit 86 further sends the packet via UDP after the interval time $T_{interval}$.

In an embodiment, the collaborative transmission device 8 based on UDP and TCP further comprises a timer (not depicted). The timer electrically connects to the computing unit 84 and a communicating unit 86, wherein the timer is activated or keeps an activating state for calculating a cumulative time when the number of packets to be sent $N_{UDP}$ is not zero; and the timer is disabled to reset the cumulative time when the number of packets to be sent $N_{UDP}$ is zero. The computing unit 84 further determines the state of the transmission flag when the cumulative time reaches the interval time $T_{interval}$. The computing unit 84 further controls the communication unit 86 to stop sending packets via UDP when the number of packets to be sent $N_{UDP}$ is not zero and the transmission flag is enabled, or controls the communication unit 86 to send packets via UDP when the number of packets to be sent $N_{UDP}$ is not zero and the transmission flag is disabled.

In an embodiment, the computing unit 84 further enables the transmission flag before the communicating unit sends the packet via TCP; and disables the transmission flag when the communicating unit 86 receives the ACK packet or when timeout occurs and the communication unit 86 does not receive the ACK packet.

In an embodiment, the computing unit 84 further calculates the first rate $R_{TCP}$ according to formula 1.

In an embodiment, the computing unit 84 further calculates the first rate $R_{TCP}$ and obtains the first parameter A when detecting one of the following conditions: the communicating unit 86 sends a synchronization packet via TCP; the cumulative time calculated by the timer reaches a default period; and the communicating unit 86 receives an acknowledge packet returning via TCP.

In an embodiment, the detecting unit 82, the computing unit, and the communicating unit 86 may be hardware, firmware, or executable software or program code stored in the memory, loaded and executed by the microprocessor or digital signal processor. If the above devices are implemented by hardware, the detecting unit 82, the computing unit 84 and/or the communicating unit 86 may be implemented by a single integrated chip or by a plurality of circuits/chips, and the present disclosure does not limit thereof. The circuits/chips or single integrated chips described above may use ASICs (Application-Specific Integrated Circuit) or an FPGAs (Field Programmable Gate Array) to implement. The memory described above is, for example, random access memory, read-only memory or flash memory, etc. In an embodiment, the communicating unit 86 includes a device supporting wired network, wireless network, mobile network and/or wireless communications. In an embodiment, the transmission device comprises a processing circuit configured to perform functions of the detecting unit 82, the computing unit 84 and/or the communicating unit 86. The processing circuit may be implemented using a microcontroller, a microprocessor, a processor, a CPU (Central Processing Unit), a DSP (Digital Signal Processor), an ASIC, a digital logical circuit, an FPGA, and/or other hardware components with computing/processing functions. In an embodiment, the transmission device 8 may be a mobile phone, a PDA (Personal Digital Assistant) a tablet computer, a laptop, a portable media player, a digital camera, a VR (Virtual Reality) and an AR (Augmented Reality) wearing device, etc.

Figure 4:
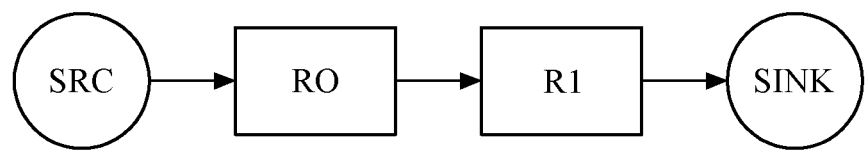
FIG. 4 is an architecture diagram of a simulated network for verification of the collaborative transmission method based on UDP and TCP according to an embodiment of the present disclosure.

Please refer to FIG. 4, which illustrates an architecture diagram of the simulated network consisted of two routers, wherein R0 and R1 represent routers on the internet. The source end SRC connects to the internet through R0 and it is supposed that there is a large amount of data continuously transmitting to the target end SINK. The administration mechanism of the queue of the router adopts DropTail. The bandwidth is 1 Mbps (million bits per second). Delay time of the transmission of the internet bottleneck is 50 ms (milliseconds). The buffer size of the internet bottleneck (between R0 and R1) is 25 packets. The target transmission rate is 500 kbps. NS2 (Network Simulation Version 2) loss module is adopted. The rate of packet loss is set to 10%, and the timings that packet loss occurs at $5^{th}$-$10^{th}$ second, $20^{th}$-$25^{th}$ second, and $35^{th}$-$40^{th}$ second. This example is a simulation that whether the collaborative transmission method based on UDP and TCP according to an embodiment of present disclosure maintain the bandwidth effectively when the conditions of slow start and congestion avoidance occur.

Figure 5:
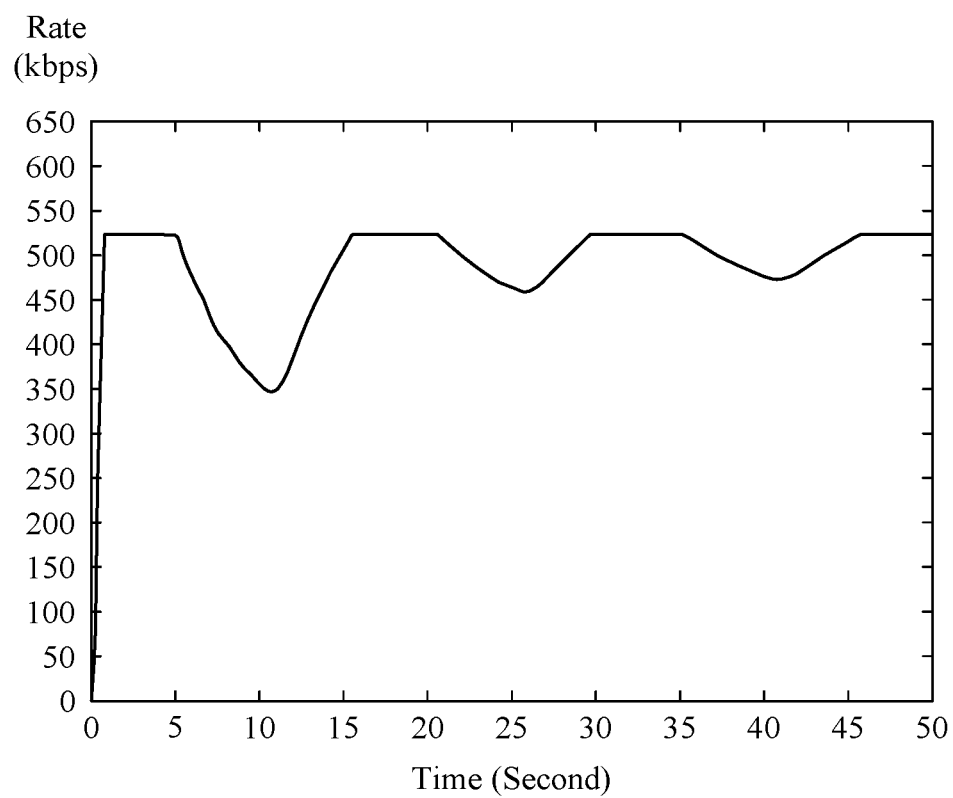
FIG. 5 is a simulation diagram of transmitter performing transmission via TCP only.

FIG. 5 illustrates a simulation diagram according to a condition of sending packets via TCP only, and the diagram shows the relationship between the current rate of TCP and the time. As shown in FIG. 5, the current rate of TCP drops obviously in the preconfigured packet loss intervals. Since the simulated packet loss conditions are randomly generated, the amplitudes of the current rate of TCP have slightly different every time. Sometimes, the dropping amplitudes of bitrate are different because of burst errors. However, the overall average is about 10%.

Figure 6:
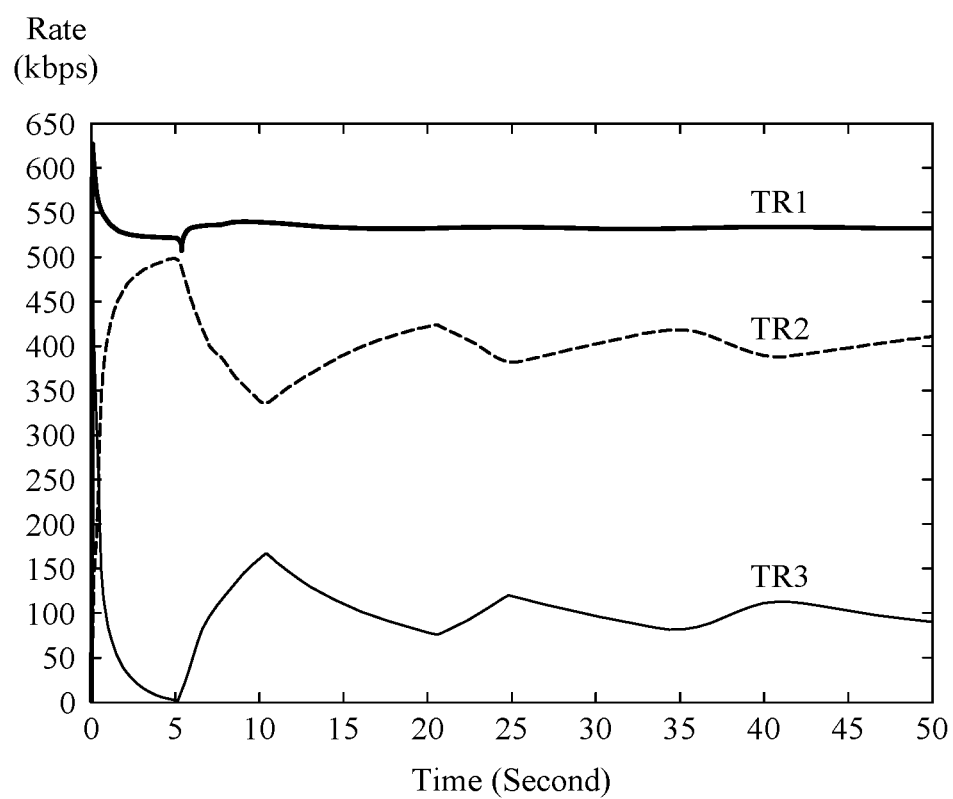
FIG. 6 is a simulation diagram of the transmitter of the collaborative transmission method based on UDP and TCP according to an embodiment of the present disclosure.

Please refer to FIG. 6, which illustrates a simulation diagram showing the relationship between rate and time according to the collaborative transmission method based on UDP and TCP according to an embodiment of the present disclosure, wherein plot TR1 represents an overall transmission rate, plot TR2 represents the current rate of the TCP transmission, and plot TR3 represents the current rate of the UDP transmission. As shown in FIG. 6, the transmission of UDP packets may compensate for the insufficient current rate of TCP transmission during the period of TCP slow start and congestion avoidance.

For a precise description of the effects of the collaborative transmission method based on UDP and TCP according to an embodiment of the present disclosure. Please refer to the following formula, where L is a bandwidth ratio that has not yet reached the target transmission rate.

$$L = \frac{\sum_{t=0}^{T} \frac{[R - r(t)]}{R}}{N} \times 100\%. \qquad \text{(formula 6)}$$

In Formula 6, T is the time needed to reach the target transmission rate, t is the current time (starting from the $0^{th}$ second), R is the data transmission rate to reach the target transmission rate, r is the current rate every 0.01 second, and N is the number of statistics (which is (T−t)/0.01).

TABLE 1 the performance of packet loss at every time interval on the basis of TCP transmission.

| Time interval | L value (%) | T value (second) |
|---|---|---|
| Slow start | 52.01 | 0.73 |
| 5-10 second | 16.77 | 14.82 |
| 20-25 second | 3.72 | 28.47 |
| 35-40 second | 2.46 | 43.69 |

Please refer to Table 1, during the time interval from 5-10 second of the period of congestion avoidance, the bandwidth ratio that has not yet reached the target transmission rate is 16.77%. In addition, when calculating from the $5^{th}$ second, the time to recover to the target transmission rate (500 kbps) is 14.82 seconds.

TABLE 2 the performance of packet loss at every time interval on the basis of the collaborative transmission method based on UDP and TCP.

| Time interval | L value (%) | T value (second) |
|---|---|---|
| Slow start | 5.41 | 0.18 |
| 5-10 second | 0.25 | 11.95 |
| 20-25 second | 0 | 25 |
| 35-40 second | 0 | 40 |

Please refer to Table 2. In the time interval from $5^{th}$ second till $10^{th}$ second of the period of congestion avoidance, the bandwidth ratio that has not yet reached the target transmission rate is 0.25%. In addition, counting from the $5^{th}$ second, the time to recover to the target transmission rate (500 kbps) is 11.95 seconds. In view of the above Tables 1 and 2, regarding the bandwidth ratio that has not yet reached the target transmission rate, in comparison with that of the collaborative transmission method based on UDP and TCP according to an embodiment of the present disclosure, said bandwidth ratio of the conventional transmission method via TCP only is 67 times thereof (16.77/0.25=67.08). Furthermore, regarding the recovering time to the target transmission rate, in comparison with that of the collaborative transmission method based on UDP and TCP according to an embodiment of the present disclosure, said recovering time of the transmission method via TCP only is 1.24 times thereof (14.82/11.95=1.24).

Furthermore, during the period of slow start, as shown in Table 1, it costs 0.73 seconds to reach the target transmission rate via TCP transmission only, and the value of L is 52.01%. According to Table 2, the collaborative transmission method based on UDP and TCP according to an embodiment of the present disclosure costs 0.18 seconds to reach the target transmission rate, and the value of L is 5.41%. In summary, the time to recover to the target transmission rate of the present disclosure is 4 times faster than the conventional method (0.73/0.18=4.05), and the bandwidth ratio to reach the target transmission rate differs by 9.5 times above (52.04/5.41=9.61).

Through the above presentation of numbers, it is obvious that the collaborative transmission method based on UDP and TCP according to an embodiment of the present disclosure can effectively use the UDP packet to compensate insufficient part of TCP transmission. In an embodiment of the present disclosure, when the available bandwidth is smaller than the expected target transmission rate, the transmission bandwidth may be as close as possible to the available bandwidth by the present disclosure. In this embodiment, the aforementioned target transmission rate $R_{TBR}$ may be the available bandwidth. When the available bandwidth is greater than the expected target transmission rate, the transmission bandwidth may be as close as possible to the expected target transmission rate. In this embodiment, the aforementioned $R_{TBR}$ may be the expected target transmission rate.

In view of the above description, the main concept of the collaborative transmission method based on UDP and TCP according to an embodiment of the present disclosure is to use UDP to try to improve the performance of TCP transmission in the mobile network or the wireless network. Because the TCP transmission has the characteristic of slow rise and rapid fall (as jagged part in the diagram), the transmission characteristics of UDP packets can be utilized to maintain the current transmission rate or moderately competing for a higher transmission rate when the TCP speed is lowered. Furthermore, using UDP immediately to assist TCP transmission to ensure the maximum transmission bit rate and achieve the demand for high quality transmission of images.

The method proposed by the present disclosure can determine the timing that there is available bandwidth with relatively small impact on the TCP, and then using UDP to help maintain the transmission rate at a level that satisfies the target transmission rate (for example, as close as possible to the available bandwidth or the expected target transmission rate), thereby improving the video transmission quality under the wireless network, and achieving a high-quality transmission of the application such as aerial photography by UAVs.

What is claimed is:

1. A collaborative transmission method based on UDP (User Datagram Protocol) and TCP (Transmission Control Protocol) comprising:
    calculating a first rate and obtaining a first parameter, wherein the first rate is a rate of transmitting packets via TCP and the first parameter is associated with a variation degree of the first rate;
    after calculating the first rate, calculating a number of packets to be sent according to a target transmission rate, the first parameter, the first rate, and a packet size, wherein the number of packets to be sent is a number of packets expected to be sent via UDP; and
    when the number of packets to be sent is not zero, determining whether to use either UDP or TCP to send a packet according to a transmission flag and updating the number of packets to be sent.

2. The collaborative transmission method based on UDP and TCP of claim 1, wherein the number of packets to be sent is calculated according to the following formula:

$$N_{UDP}=(R_{TBR}*A-R_{TCP})P,$$

wherein $N_{UDP}$ is the number of packets to be sent, $R_{TBR}$ is the target transmission rate, A is the first parameter, $R_{TCP}$ is the first rate and P is the packet size.

3. The collaborative transmission method based on UDP and TCP of claim 1, before sending the packet via UDP, further comprising:
    sending the packet via UDP after an interval time, wherein the interval time is calculated according to the following formula:

$$T_{interval}=1/N_{UDP},$$

wherein $T_{interval}$ is the interval time and $N_{UDP}$ is the number of packets to be sent.

4. The collaborative transmission method based on UDP and TCP of claim 3, wherein a step of determining whether to use either UDP or TCP to send a packet according to the transmission flag and updating the number of packets to be sent when the number of packets to be sent is not zero further comprising:
    activating a timer or keeping an activating state of the timer for calculating a cumulative time when the number of packets to be sent is not zero;
    and disabling the timer when the number of packets to be sent is zero.

5. The collaborative transmission method based on UDP and TCP of claim 4, further comprising:
    determining whether the cumulative time reaches the interval time after the timer is activated; wherein
    determining a state of the transmission flag when the cumulative time reaches the interval time; or
    calculating the cumulative time continuously by the timer when the cumulative time does not reach the interval time.

6. The collaborative transmission method based on UDP and TCP of claim 4, wherein the step of determining whether to use either UDP or TCP to send the packet according to a transmission flag and updating the number of packets to be sent when the number of packets to be sent is not zero further comprising:
    stopping transmitting the packet via UDP when the transmission flag is enabled; or
    transmitting the packet via UDP when the transmission flag is disabled.

7. The collaborative transmission method based on UDP and TCP of claim 1, wherein the step of determining whether to use either UDP or TCP to send the packet according to a transmission flag and updating the number of packets to be sent when the number of packets to be sent is not zero further comprising:
    enabling the transmission flag before a TCP packet is transmitted; and
    disabling the transmission flag when an acknowledge packet of TCP is received or the acknowledge packet of TCP is not received before a timeout.

8. The collaborative transmission method based on UDP and TCP of claim 1, wherein the first parameter represents an average rate of packet loss during a TCP transmission or during a TCP connection.

9. The collaborative transmission method based on UDP and TCP of claim 1, wherein the first rate is calculated according to the following formula:

$$R_{TCP}=N_{TCP}/(T_{current}-T_{start}),$$

wherein $R_{TCP}$ is the first rate, $N_{TCP}$ is a total number of packets, $T_{current}$ is a current time, and $T_{start}$ is a starting time, the current time is the earliest time transmitting packets via TCP, and the total number of packets is a number of all packets transmitted from the starting time to the current time.

10. The collaborative transmission method based on UDP and TCP of claim 1, further comprising calculating the first rate and obtaining the first parameter when one of the following conditions is detected:
    a synchronization packet sent via TCP;
    a default period is passed; and
    an acknowledge packet returning via TCP is received.

11. A collaborative transmitter based on UDP and TCP comprising:
    a processing circuit configured to:
        obtain a first rate and a first parameter, wherein the first rate is a rate of transmitting packets via TCP and the first parameter is associated with a variation degree of the first rate;
        calculate the first rate and calculate a number of packets to be sent according to a target transmission rate, the first parameter, the first rate, and a packet size, wherein the number of packets to be sent is a number of packets expected to be sent via UDP; and
        determine whether to use UDP or TCP to send a packet according to a transmission flag and updating the number of packets to be sent when the number of packets to be sent is not zero.

12. The collaborative transmitter based on UDP and TCP of claim 11, wherein the processing circuit calculates the number of packets to be sent according to the following formula:

$$N_{UDP}=(R_{TBR}*A-R_{TCP})/P,$$

wherein $N_{UDP}$ is the number of packets to be sent, $R_{TBR}$ is the target transmission rate, A is the first parameter, $R_{TCP}$ is the first rate and P is the packet size.

13. The collaborative transmitter based on UDP and TCP of claim 11, wherein the processing circuit further calculates an interval time according to the following formula:

$$T_{interval}=1/N_{UDP},$$

wherein $T_{interval}$ is the interval time and $N_{UDP}$ is the number of packets to be sent; and the processing circuit further sends the packets via UDP after the interval time.

14. The collaborative transmitter based on UDP and TCP of claim 13, further comprising a timer electrically connecting to the processing circuit, wherein the timer is activated or keeps an activating state for calculating a cumulative time when the number of packets to be sent is not zero; and the timer is disabled to reset the cumulative time when the number of packets to be sent is zero.

15. The collaborative transmitter based on UDP and TCP of claim 14, wherein the processing circuit determines a state of the transmission flag when the cumulative time reaches the interval time.

16. The collaborative transmitter based on UDP and TCP of claim 14, wherein when the number of packets to be sent is not zero and the transmission flag is enabled, the processing circuit suspends transmitting the packet via UDP, or when the number of packets to be sent is not zero and the transmission flag is disabled, the processing circuit transmits the packet via UDP.

17. The collaborative transmitter based on UDP and TCP of claim 11, wherein the processing circuit enables the transmission flag before the processing circuit transmits the packet via TCP, when the processing circuit receives an acknowledgement packet corresponding to TCP before a timeout, the processing circuit disables the transmission flag.

18. The collaborative transmitter based on UDP and TCP of claim 11, wherein the first parameter represents an average rate of packet loss during a TCP transmission or during a TCP connection.

19. The collaborative transmitter based on UDP and TCP of claim 11, wherein the processing circuit calculates the first rate according to the following formula:

$$R_{TCP}=N_{TCP}/(T_{current}-T_{start}),$$

wherein $R_{TCP}$ is the first rate, $N_{TCP}$ is a total number of packets, $T_{current}$ is a current time, and $T_{start}$ is a starting time, the current time is the earliest time transmitting packets via TCP, and the total number of packets is a number of all packets transmitted from the starting time to the current time.

20. The collaborative transmitter based on UDP and TCP of claim 14, wherein the processing circuit further calculates the first rate and obtains the first parameter when detecting one of the following conditions:
the processing circuit sends a synchronization packet via TCP;
the cumulative time calculated by the timer reaches a default period; and
the processing circuit receives an acknowledge packet returning via TCP.

* * * * *